(12) United States Patent
Graefe

(10) Patent No.: US 8,700,822 B2
(45) Date of Patent: Apr. 15, 2014

(54) PARALLEL AGGREGATION SYSTEM

(75) Inventor: Goetz Graefe, Madison, WI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 261 days.

(21) Appl. No.: 13/179,188

(22) Filed: Jul. 8, 2011

(65) Prior Publication Data

US 2013/0013824 A1    Jan. 10, 2013

(51) Int. Cl.
*G06F 3/00* (2006.01)
*G06F 7/00* (2006.01)

(52) U.S. Cl.
USPC ............................................ 710/52; 707/769

(58) Field of Classification Search
USPC ................. 710/52–57; 707/758, 769
See application file for complete search history.

(56) References Cited

U.S. PATENT DOCUMENTS

| | | | |
|---|---|---|---|
| 5,202,981 A * | 4/1993 | Shackelford | 707/769 |
| 5,850,547 A * | 12/1998 | Waddington et al. | 718/102 |
| 6,115,705 A * | 9/2000 | Larson | 1/1 |
| 6,850,952 B2 * | 2/2005 | Tse et al. | 1/1 |
| 7,779,008 B2 | 8/2010 | Dageville et al. | |
| 2008/0263044 A1 * | 10/2008 | Cantrill | 707/8 |
| 2010/0042607 A1 | 2/2010 | Min et al. | |
| 2010/0082705 A1 | 4/2010 | Ramesh et al. | |
| 2010/0131540 A1 | 5/2010 | Xu et al. | |
| 2012/0011144 A1 * | 1/2012 | Transier et al. | 707/769 |

FOREIGN PATENT DOCUMENTS

CN    101763223 A    6/2010

OTHER PUBLICATIONS

Shatdal, Ambuj and Jeffrey F. Naughton, "Adaptive Parallel Aggregation Algorithms". San Jose, CA. SIGMOD 1995.
Larson, Per-Ake. "Data Reduction by Partial Preaggregation". The Computer Society. Proceedings of the 18th International Conference on Data Engineering, 2002.

* cited by examiner

*Primary Examiner* — Christopher Shin

(57) ABSTRACT

A parallel aggregation system includes a data analysis module to determine a unique key value of a record to be forwarded to a destination. A pre-processing module may determine existence of the record in a buffer and priority of the record in a priority queue. Based on the existence and priority, the pre-processing module may absorb the record in the buffer and selectively forward another record in the buffer to the destination.

20 Claims, 15 Drawing Sheets

PARALLEL AGGREGATION SYSTEM

BACKGROUND

Computer systems may rely on parallel computations for increased performance. For storage of large datasets, parallel computers may distribute or partition data records to multiple locations, e.g., local storage attached to nodes in a parallel computer. One method of improving performance and scalability may be to employ efficient local processes as well as minimal re-partitioning of intermediate results. For example, one process may include data reduction prior to re-partitioning, e.g., by grouping or compression. If grouping or compression is not effective, e.g., because input data is already compressed, the attempt to compress (group, etc.) the data prior to re-partitioning may not be beneficial. Further, it may not be known a priori whether or not compression (grouping, etc.) will be effective. Thus, any a priori decision may turn out to be sub-optimal during execution.

An example of a parallel system may include a parallel database management system, where each table or index (dataset) may be partitioned across multiple nodes, each with its own storage or assigned storage partition. Rows in a table (or records in an index) may be partitioned using a range-based or hash-based partitioning function such that equal values are assigned to the same partition. When processing a SQL "group by" query, partitioning at each node may be sufficient to compute the global result if the grouping columns in the query are equal to (or, more generally, functionally dependent on) the partitioning columns of the stored dataset. If this is not the case, evaluation of the query may need re-partitioning of data.

An example of an evaluation plan may include re-partitioning of the data according to the grouping attributes followed by a single step for grouping and aggregation. If, however, grouping reduces the data volume by a factor larger than the number of nodes involved, then the data volume that is to be re-partitioned can be reduced by grouping and aggregation prior to re-partitioning. In other words, some grouping, aggregation, and data reduction precedes re-partitioning and the final grouping and aggregation follows. Data distributions are however generally not uniform in practice. If data partitions differ in characteristics, the most optimal computations reflecting those characteristics may also differ.

BRIEF DESCRIPTION OF DRAWINGS

The embodiments are described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Also, the embodiments may be used together in various combinations.

1. Overview

If data records are stored at multiple locations such as nodes in a parallel computer, and when such data records are to be grouped based on common values in an attribute that does not govern the assignment of data records to locations, then data records may be re-partitioned among locations as part of the grouping operation. One optimization technique is to group records prior to re-partitioning, also known as local grouping prior to global grouping or as local/global aggregation. Local/global aggregation can be very effective or it can be detrimental to overall performance. Therefore, it can be enabled dynamically or adaptively within each data storage location with a single decision per location or by a finer granularity, e.g., each distinct value of the grouping attribute.

The decision whether or not local aggregation is cost-efficient can be taken at a fine granularity and can be revised repeatedly while processing the local input at each node. Specifically, each node can make a local decision for each group, i.e., each distinct value of the grouping attribute, and it can revise the decision repeatedly, e.g., if the input contains distinct values of the grouping attribute with a time-varying distribution.

Figure 1:
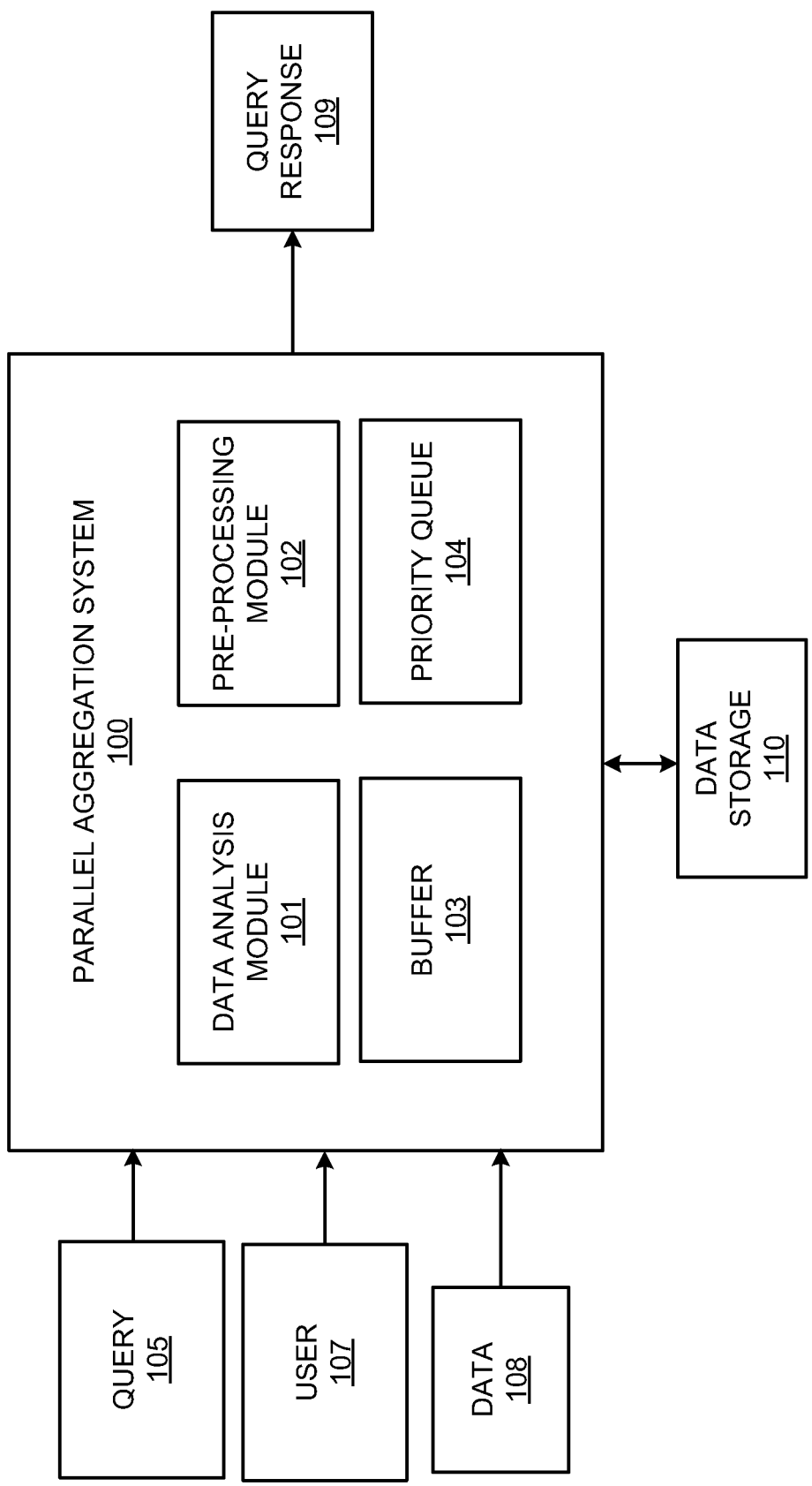
FIG. 1 illustrates a parallel aggregation system, according to an embodiment.

According to an embodiment, a parallel aggregation system selectively performs an operation per unique key value for a given node. A key value may be the specific value for a key field within a specific record. For example, the key value may be the element that is being grouped on. Examples of operations may include aggregation and duplicate removal, based on the particular characteristics of the data. In an example, as shown in FIG. 1 and described in detail below, the system may include a data analysis module to determine a unique key value of a record to be forwarded to a destination. A pre-processing module may determine existence of the record in a buffer and priority of the record in a priority queue. Based on the existence and priority, the pre-processing module may absorb the record in the buffer and selectively forward another record in the buffer to the destination.

In an embodiment, the parallel aggregation system may combine local and global aggregation, and further data exchange into a single operation. In an example, the system may include a single memory allocation and associative data structure, e.g., a hash table. Input records from the input (e.g., a table scan) or from a parallel instance of the system may be treated similarly. For example, input records from parallel instances of the system may be processed first.

As described in further detail below, the parallel aggregation system may transfer records to temporary storage (e.g., a run in the system based on sorting or an overflow partition in the system based on partitioning) or to parallel instances of the system. Temporary storage may be provided for records that do not need further partitioning, and otherwise, parallel instances may be provided.

As also described in further detail below, upon arrival of an input record, its grouping keys may be extracted and matched with records already in the data structure. If found, aggregation may proceed. Otherwise, if sufficient free memory is available, a new record may be allocated in the data structure. Otherwise, a sufficient number of records may be ejected from the data structure. In an example, a single record may be used, but multiple records may be used if record lengths differ.

In order to maximize the benefit of the in-memory data structure, as described below, a buffer may be provided for retention of records that absorb many input records. In an embodiment, based on the buffer size, a record that has not absorbed an input record for the longest time may be ejected from the buffer. For the buffer, a priority queue may be used to maintain the appropriate information efficiently and incrementally. The root of the priority queue may point to the record with the longest time since it absorbed an input record. If the key value distribution in the input is skewed such that some records absorb more input records than others, the leaves of the priority queue may point to the active records. If the priority queue is implemented with a tree of losers, and if maintenance of the priority queue relies exclusively on leaf-to-root paths through the binary heap representing the priority queue, then half of all aggregation operations may inspect one leaf in the priority queue, and aggregation operations may inspect two nodes in the priority queue on average. Additionally, if the key value distribution is skewed, more than half of all aggregation operations may inspect one leaf, and all aggregation operations on average may inspect less than two nodes in the priority queue.

The parallel aggregation system may thus adapt to differences between nodes in a parallel computer system. The system may further adapt to differences based on key values as well as position within the input stream. The system may facilitate elimination of redundancy in memory before incurring transfer costs for records, and may focus the additional expense of eliminating redundancy on those key values for which it is effective. Thus, the parallel aggregation system may selectively perform duplicate removal for records where removing duplicates may be beneficial from an overall system operation perspective of transferring a record over a network and also removing duplicates. The overall system operation perspective may include factors such as bandwidth utilization, electricity utilization, and computation requirements. Thus, for a record where duplicate removal may provide a minimal benefit with regard to transfer of a record over the network but at the end provide minimal or no benefit in terms of actual processing of a query, the system may selectively forego duplicate removal at the local node level.

2. System

FIG. 1 illustrates the parallel aggregation system 100, according to an embodiment. The system 100 may include a data analysis module 101 to determine a unique key value of a record to be forwarded to a destination. The modules and other components of the system 100 may include machine readable instructions, hardware or a combination of machine readable instructions and hardware. A pre-processing module 102 may determine existence of the record in a buffer 103 and priority of the record in a priority queue 104. Based on the existence and priority, the pre-processing module 102 may absorb the record in the buffer 103 and selectively forward another record in the buffer to the destination. The pre-processing module 102 may further directly forward the record to the destination if the record has not been absorbed in the buffer 103 for a predetermined amount of time. The results of the query 105 by a user 107 pertaining to data 108 may be generated at query response 109. The system 100 may include a data storage 110, and include a database or other type of data management system.

In a parallel computer system where multiple nodes may perform the same or similar operations on different partitions of data, the different partitions of the data may be dissimilar. For example, one partition may be smaller than another, or one partition may include more distinct key values than another partition. Thus instead of all nodes performing the same or similar operations, or a node performing an operation for all records associated therewith, the system 100 may selectively perform an operation per unique key value for a given node. Examples of operations performed per unique key value may include aggregation or duplicate removal for a particular record, and a determination of an appropriate process for performing aggregation or duplicate removal. For example, a process may be particularly suited for small local results, but may be inefficient if the local results are large. Examples of processes may include sorting processes, hash partitioning processes, and index based processes. Thus based on a number of duplicates per unique key value, records may be processed by means of one of the foregoing processes for aggregation and duplicate removal.

Various aspects related to the parallel aggregation system 100 are described before proceeding with a description of the foregoing modules.

Figure 2:
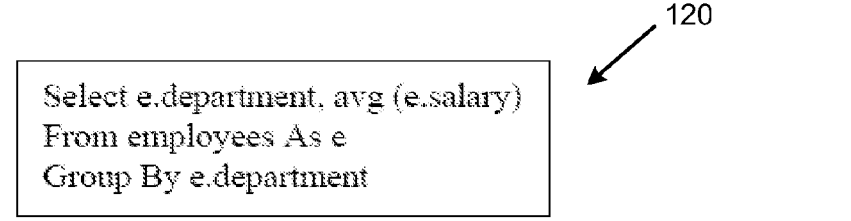
FIG. 2 illustrates an example of a query in SQL syntax, according to an embodiment.

FIG. 2 illustrates a query 120 in SQL syntax, according to an embodiment. Other query systems may offer similar functionality with their own specific syntax. This functionality may be related to "big data" processing and specifically the "reduce" operations in modern-day 'map-reduce' style.

Figure 3:
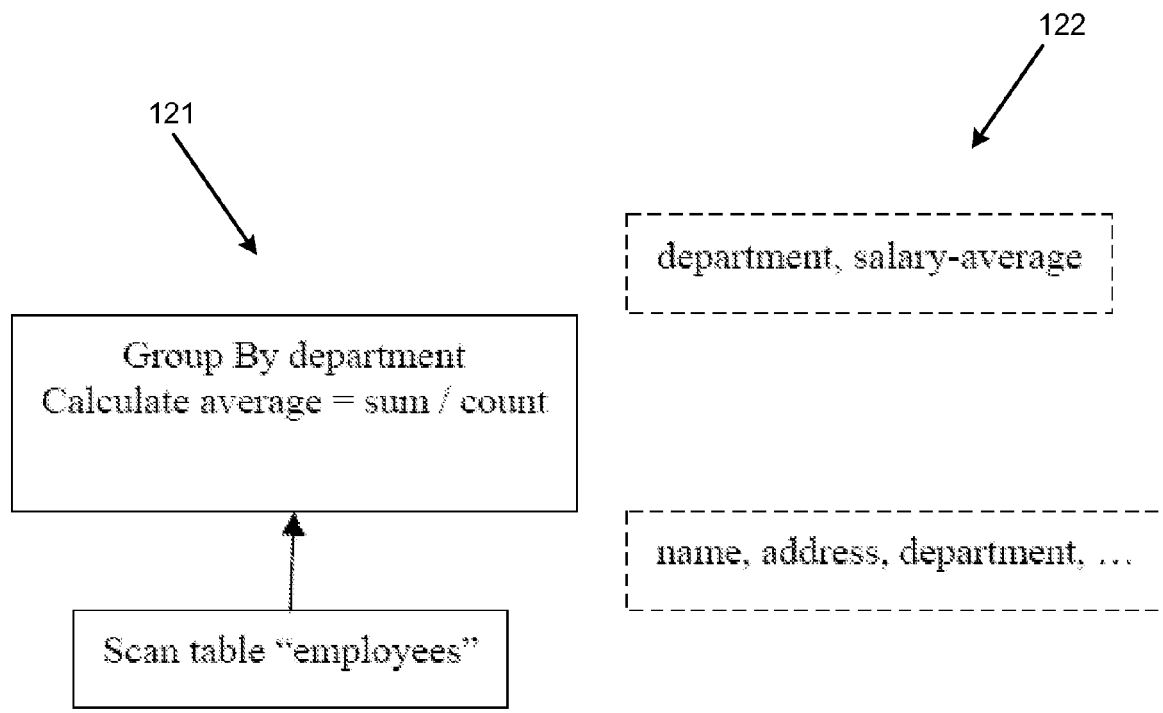
FIG. 3 illustrates an example of an equivalent query execution plan and record formats of intermediate results, according to an embodiment.

FIG. 3 illustrates a similar query execution plan 121 (solid) and the record formats of intermediate results 122 (dashed), according to an embodiment. In the relationship between the two operations, the bottom box is the producer and the top box is the consumer. In other words, data flows bottom-up (solid arrow). In many implementations, control flows top-down (not shown in the illustration). Thus, a consumer operation is driven by appropriate method invocations. These methods may produce data items when they return to the caller.

Figure 4:
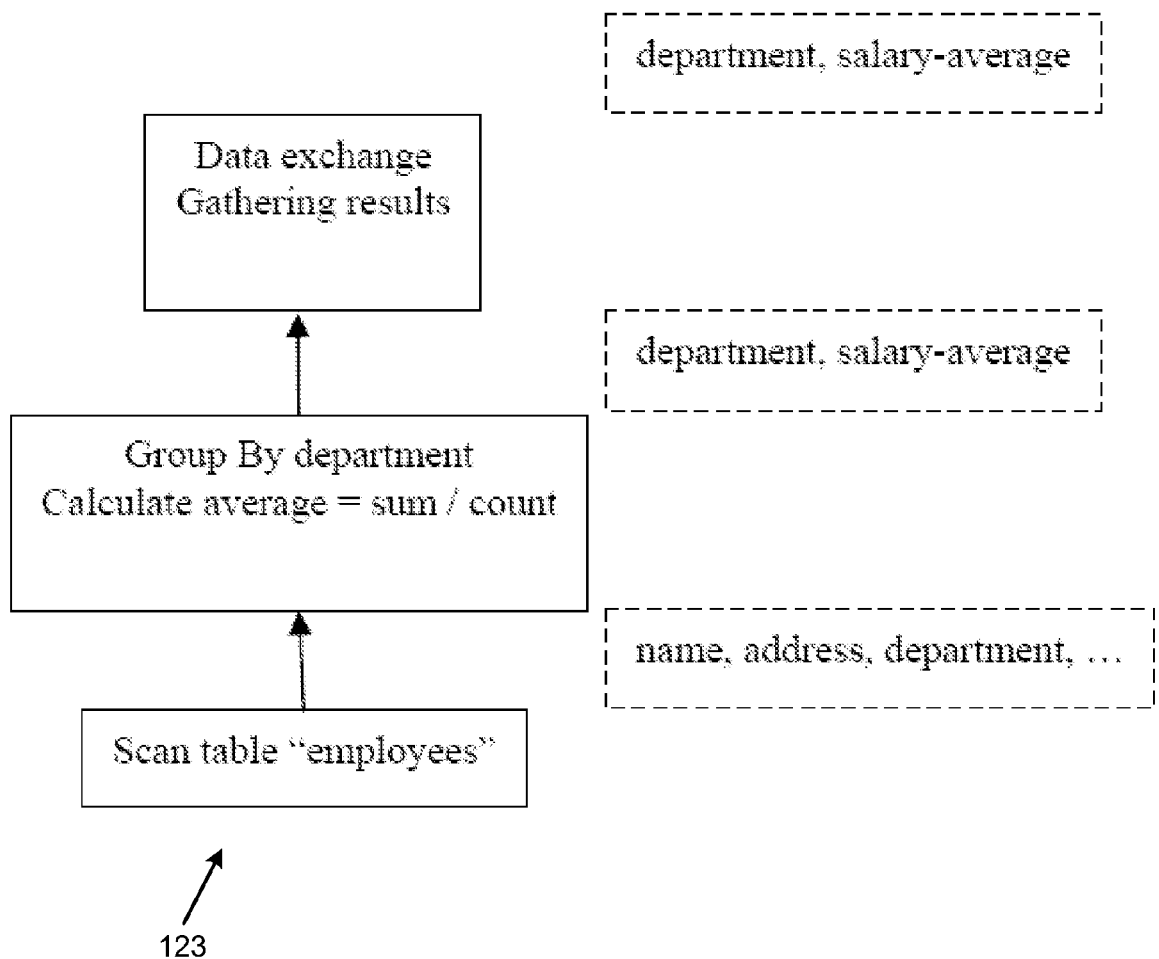
FIG. 4 illustrates a query execution plan that relies on a partitioned table prior to query execution, according to an embodiment.

FIG. 4 illustrates a query execution plan 123 that relies on an employee table partitioned prior to query execution, according to an embodiment. For example, for a table of employees including names, addresses, employment year, department ID, and salary, grouping may include determination of an average salary per department. In order to determine the average salary per department, records that have the same department ID may be brought together. For multiples of such records, the salaries may be added and counted. An average salary per department may be computed. Partitioning ensures that all rows with the same "department" value are in the same partition and thus in the same node in a "massively parallel" or "shared-nothing" database. Parallel query execution computes the local grouping results and then gathers the local results to form the global result.

Figure 5:
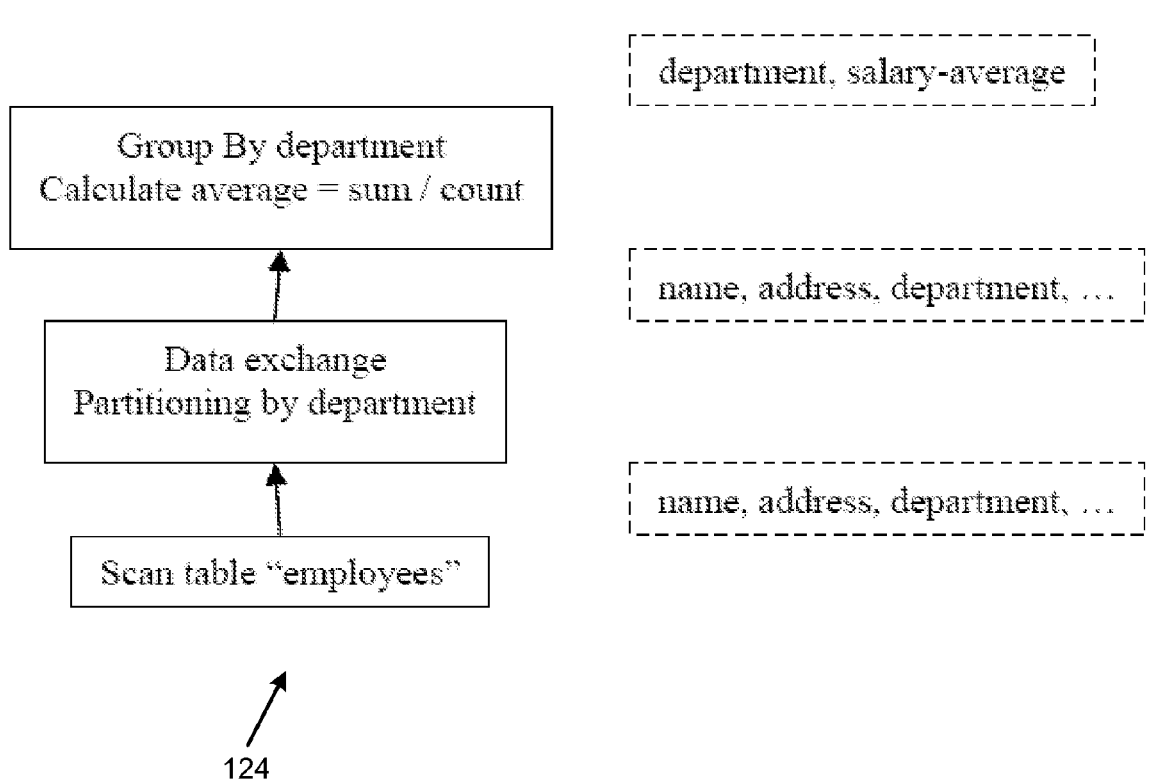
FIG. 5 illustrates a query execution plan that partitions original input records prior to calculating aggregation, according to an embodiment.

FIG. 5 illustrates a query execution plan 124 that partitions the original input records prior to calculating the aggregation. The final result in this plan is distributed across all the nodes that participate in this calculation. If all results are required in a single node, e.g., a single-node application, a gathering operation may be added to the query execution plan of FIG. 5.

Figure 6:
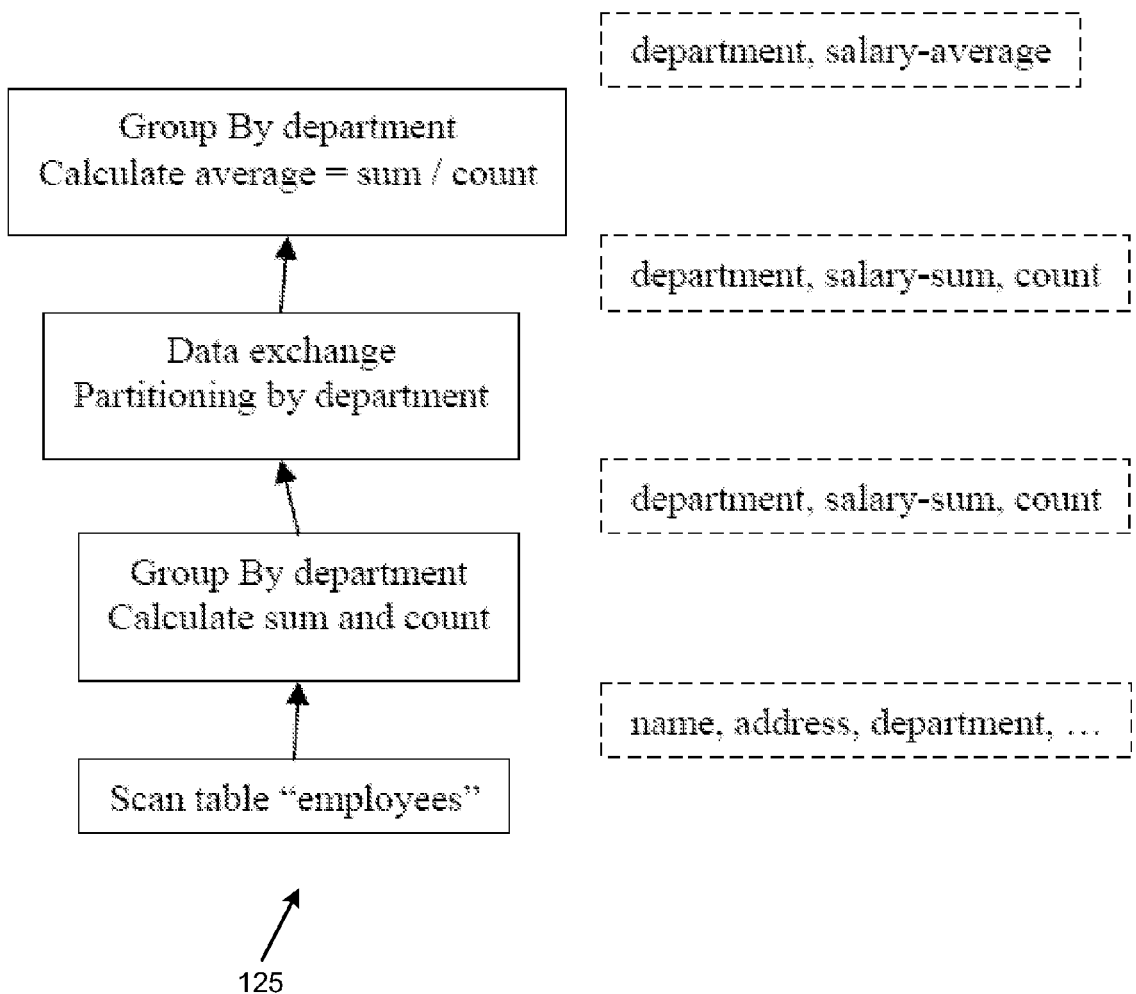
FIG. 6 illustrates a query execution plan that optimizes partitioning effort by aggregating records prior to data exchange among database nodes, according to an embodiment.

FIG. 6 illustrates a query execution plan 125 that optimizes partitioning effort by aggregating records prior to data exchange among database nodes, according to an embodiment. For the foregoing example, each source node attempts to reduce data volume by replacing multiple employee records belonging to the same department by a single summary record. Due to the specific aggregation function requested in the query (average), the local aggregation can calculate only preliminary values (e.g., sums). The final global aggregation may calculate sums of sums etc. and eventually the average salary per department.

Figure 7:
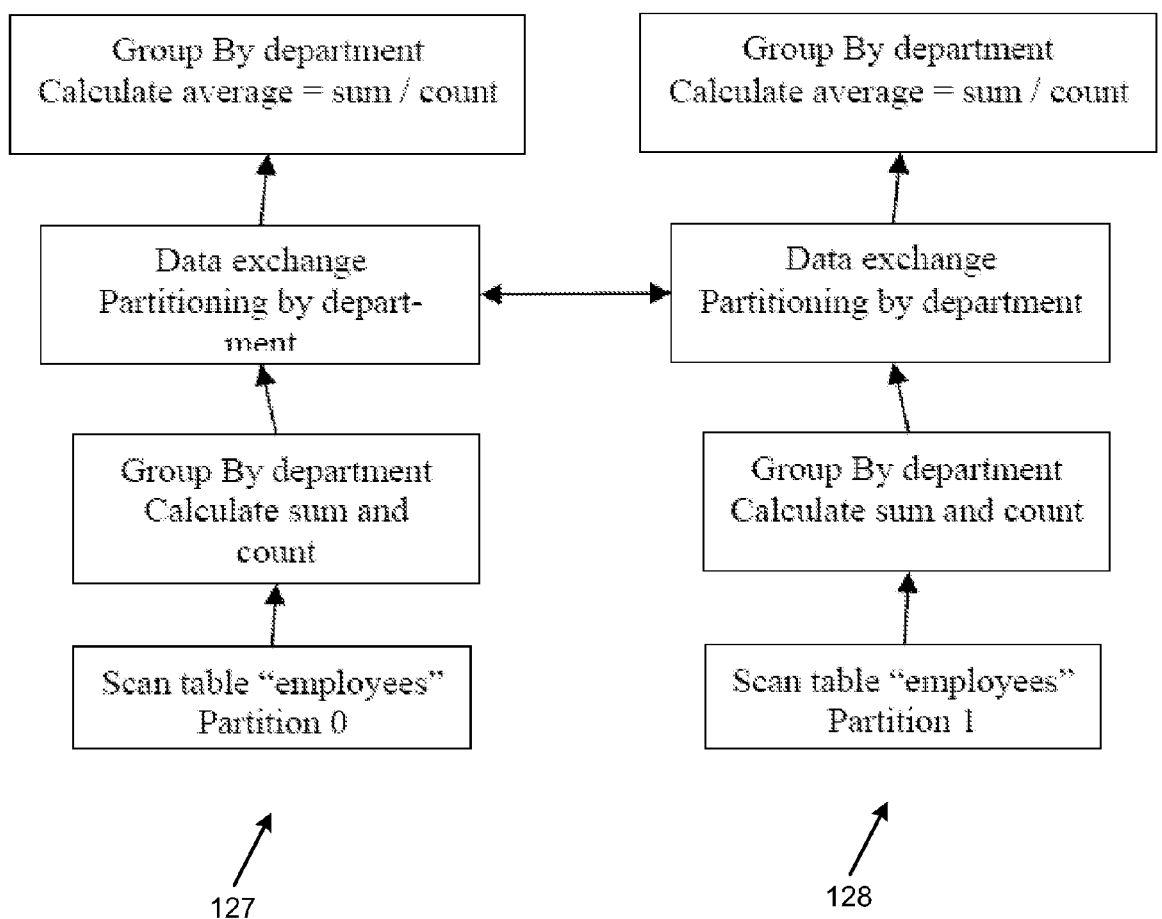
FIG. 7 illustrates a data flow for the query execution plan of FIG. 6 running on two nodes, according to an embodiment.

FIG. 7 illustrates the data flow 126 for the query execution plan of FIG. 6 running on two nodes 127, 128, according to an embodiment. Each node may execute the plan independently, and communication between nodes is provided only in the data exchange steps.

Figure 8:
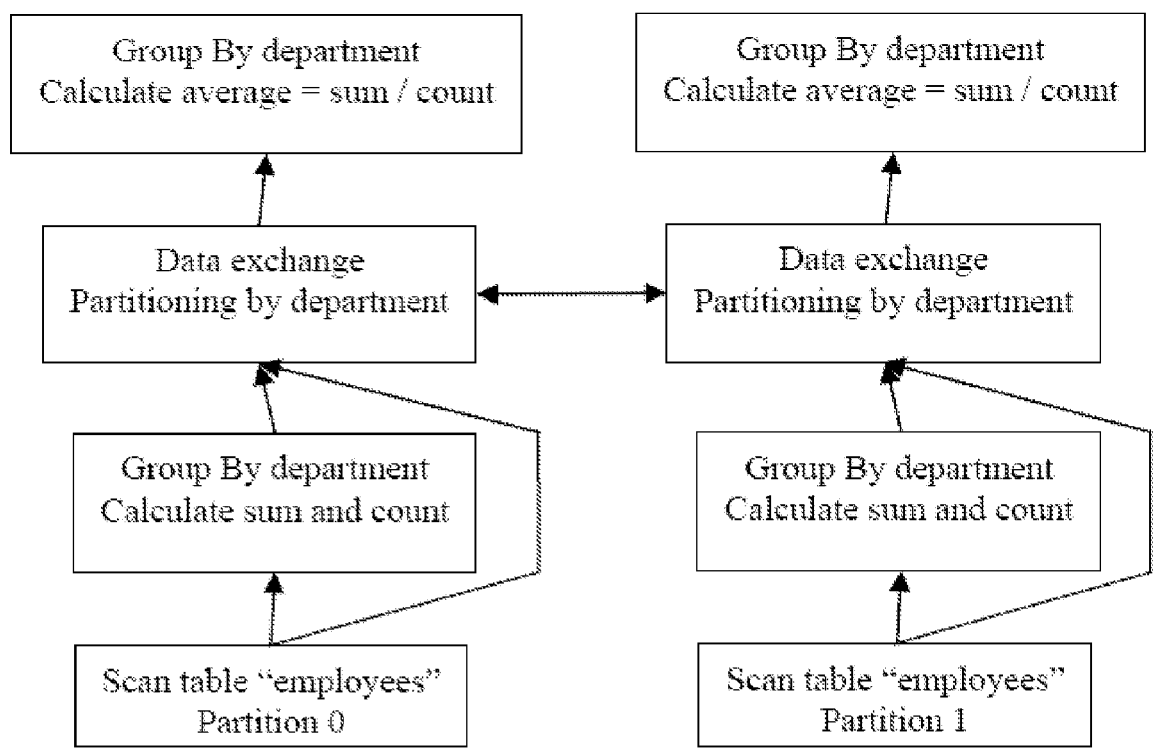
FIG. 8 illustrates the same query execution plan as FIG. 7, except that the initial, local aggregation step is optional, according to an embodiment.

FIG. 8 illustrates the same query execution plans as FIG. 7 except that the initial, local aggregation step may be omitted. In each node, all data from the local scan operation may flow either to the local grouping operation or directly to the data exchange operation. Each node makes a single local decision, and that decision affects all local scan results.

Figure 9:
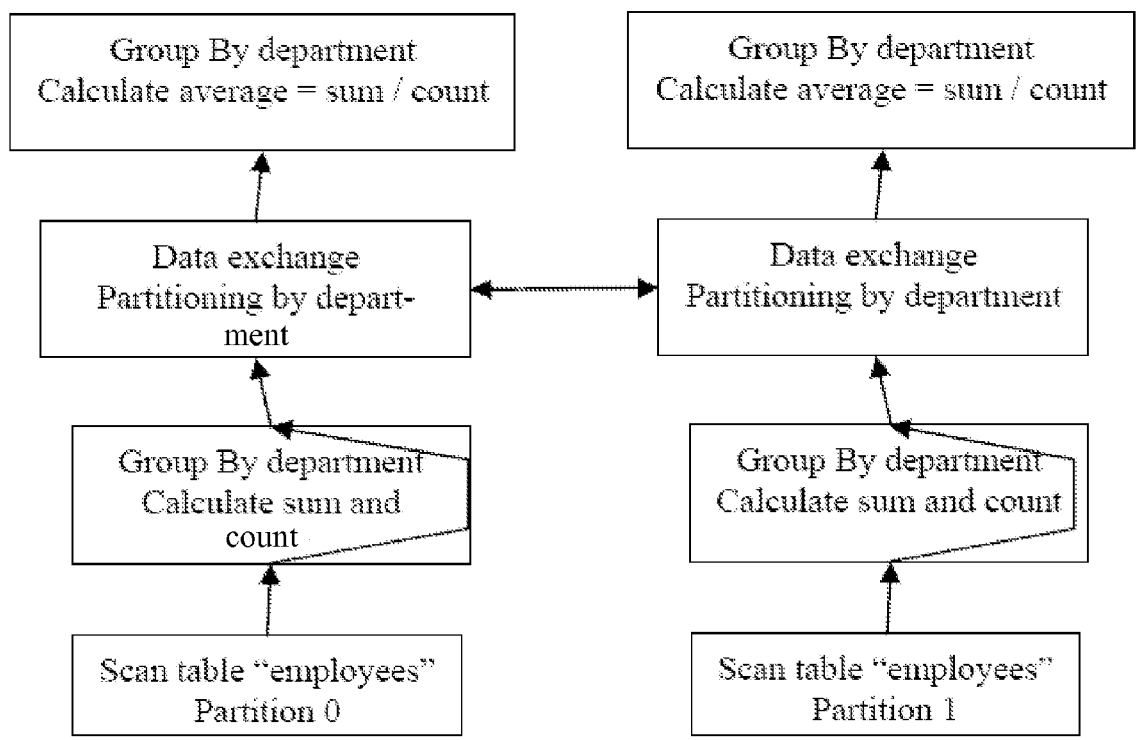
FIG. 9 illustrates the same query execution plan as FIG. 7, except that the decision to bypass the local aggregation logic is embedded in the aggregation operation, according to an embodiment.

FIG. 9 illustrates the same query execution plan as FIG. 7, except that the decision to bypass the local aggregation logic is embedded in the aggregation operation and affects individual records rather than the entire scan output as a whole. Moreover, the decision which groups are aggregated locally and which groups are aggregated globally, i.e., which groups of input records bypass the local aggregation logic, may vary over time.

Figure 10:
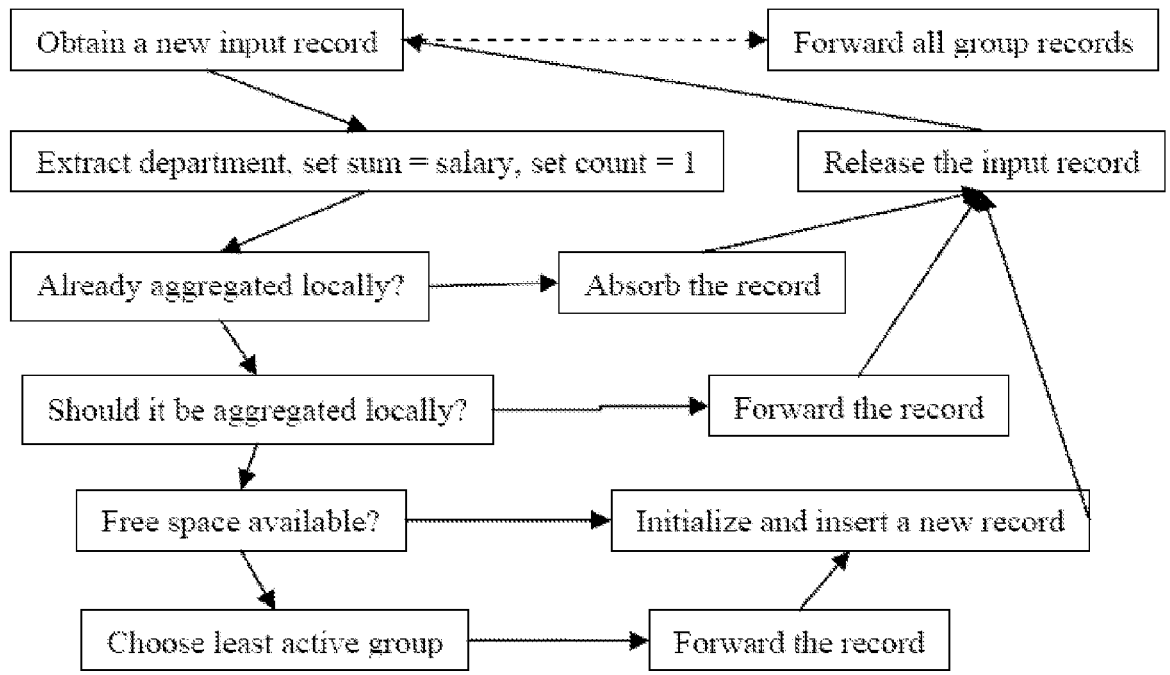
FIG. 10 illustrates local decision flow, according to an embodiment.

FIG. 10 illustrates local decision flow 129, according to an embodiment. The flow begins at the top left. If that operation fails, the flow skips along the dashed line to the top right and then ends.

Figure 11:
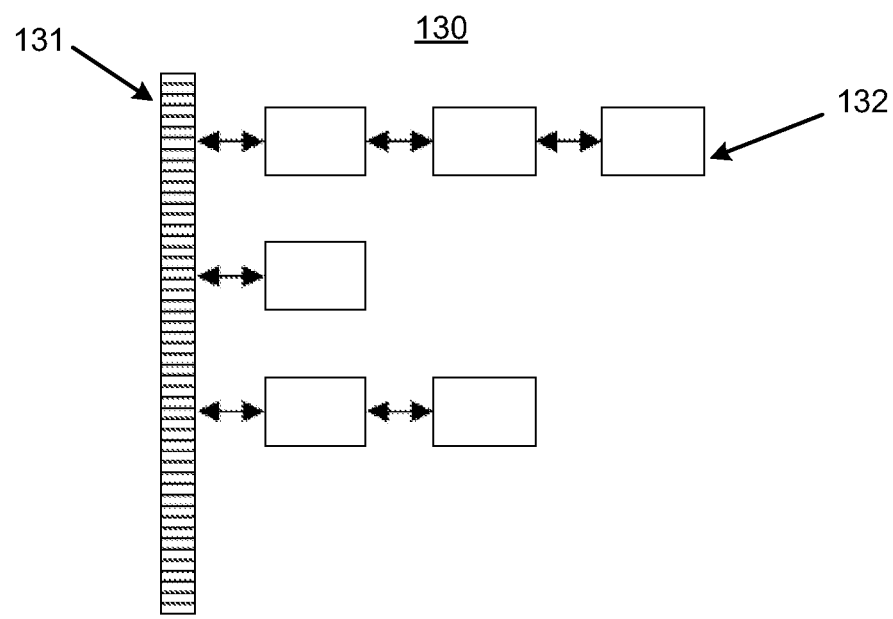
FIG. 11 illustrates a hash table including a hash directory and records forming a doubly-linked list in order to permit efficient insertion and removal, according to an embodiment.

FIG. 11 illustrates a hash table 130 including its hash directory 131 and the records 132 forming a doubly-linked list in order to permit efficient insertion and removal. When a new record is inserted, it is included in the linked list anchored by the appropriate entry in the hash directory as guided by the hash function applied to the value in the grouping columns. When the record is evicted and forwarded, it is removed from the hash table and its linked lists. While the records may be allocated in an array 133 as shown in FIG. 12, the pointers may permit them to appear linked as shown in FIG. 11.

Figure 12:
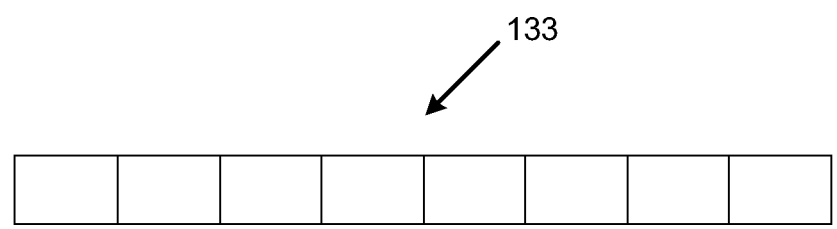
FIG. 12 illustrates an array of records, according to an embodiment.

FIG. 12 illustrates the array 133 of records, according to an embodiment. Using address arithmetic based on the array in FIG. 12, records have numbers 0, 1, 2, . . . etc. This system of numbering records is used in the priority queue 104 that guides replacement of records, i.e., tracking whether or not a record has recently absorbed an input record.

Figure 13:
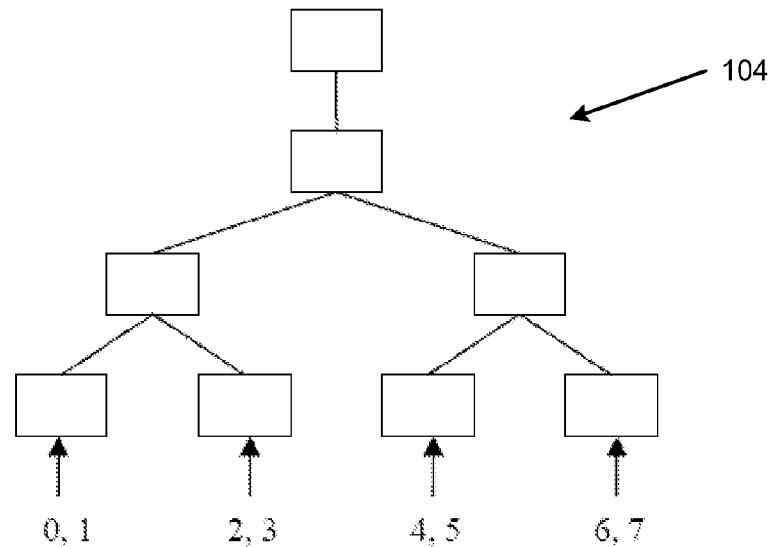
FIG. 13 illustrates a priority queue, according to an embodiment.

FIG. 13 illustrates an example of the priority queue 104 of FIG. 1, specifically the form known as "tree of losers," according to an embodiment. The priority queue 104 provides for all operations to be implemented as leaf-to-root passes. If a key value is updated other than the one currently in the root (see top of FIG. 13), the search may end immediately in the leaf with probability 0.5. Otherwise, the search may proceed to the next level up, where it again ends with probability 0.5, etc. $1 \times 0.5 + 2 \times 0.25 + 3 \times 0.125 + \ldots = 2$. In other words, a search implemented as leaf-to-root pass visits two nodes independent of the number of items in the priority queue. Thus, a priority queue implemented as 'tree of losers' may be one solution for this problem and similar problems. In multi-threaded environments, hardware transactional memory may be just as efficient as a complex software implementation focused on lock-free data structures.

Figure 14:
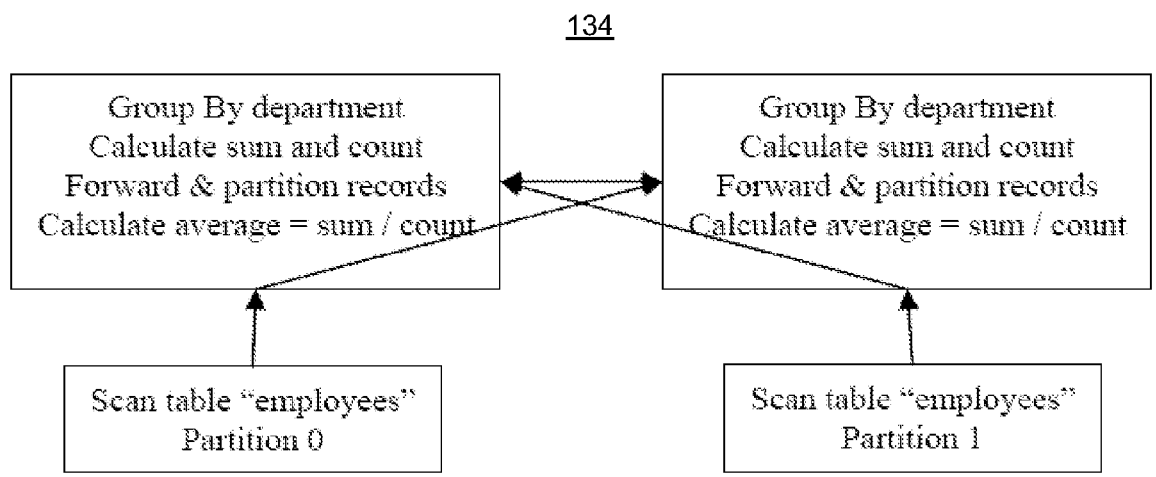
FIG. 14 illustrates an optimized implementation of local and global aggregation, according to an embodiment.

FIG. 14 illustrates integration of local aggregation, re-partitioning, and global aggregation, and thus discloses an optimized implementation 134 of local and global aggregation, according to an embodiment. Each record from the input stream (here from a scan operation) may be first assigned to a global aggregation node. If that is the same as the current node, the record may be placed in the local hash table. If that local hash table is full, a record destined for another node may be evicted and forwarded there. If the final aggregation node is elsewhere, local aggregation may be considered. As discussed herein, a single hash table is employed for both local and global aggregation. If the appropriate group is already being aggregated, the input record may be absorbed into the existing group. If not, a new group record may be started and inserted into the hash table. Again, if the local hash table is full, a record destined for another node may be evicted and forwarded. Eviction from the hash table may be guided by the priority queue 104. Whenever a record in a hash table is created or absorbs an additional input record, its position in the priority queue 104 may be updated.

Operation of the modules and components of the system 100 is described.

As described above, in a parallel computer system where multiple nodes may perform the same or similar operations on different partitions of data, the different partitions of the data may be dissimilar. For example, one partition may be smaller than another, or one partition may include more distinct key values than another partition. Thus instead of all nodes performing the same or similar operations, or a node performing an operation for all records associated therewith, the system 100 may selectively perform an operation per unique key value for a given node.

For example, given a data distribution over n nodes (e.g., 10 nodes), for a query requesting unique data (e.g., duplicates excluded) in a table distributed over the n nodes, the same record may occur on nodes 3 and 7. In order to filter duplicates, one method of filtering duplicates may be to scan all records locally, take all the fields in the records, apply a hash function to the record, and that hash function may determine where (e.g., which node) the record would be sent. For example, the specific record that is on node 3, may be sent to node 5. However, if a copy of the same record exists on node 7, and the same hash function is applied, the record may also be sent to node 5. After all copies of the record are sent to node 5, appropriate duplicate removal may be performed such that node 5 produces one copy of the record.

One method of optimizing processing of records may be to remove all duplicates prior to forwarding of the record to another node. For the example including 10 nodes described above, all records may be processed locally before being forwarded to another node. Thus for a node including multiple (e.g., 100) duplicates of a record, one copy of the record may be forwarded after duplicate removal. Such a process of duplicate removal may be beneficial if all nodes include several duplicates of records (e.g., each node includes 100+ copies of each record). If however a node includes on average of 1.01 duplicates of a record, the process of removing duplicates may not be beneficial from a system resource utilization perspective. Thus another method of processing a query may be to allow each node to make a local decision whether or not to perform a preliminary duplicate removal step before sending its records to a destination node. If the local decision is based, for example, on an average number of records per node, such a local decision may also not be beneficial from a system resource utilization perspective. For example, if for a given node a record includes 1000 duplicates and all remaining records include one or no duplicates, then on average, such a node may include 50 duplicates per record. Since the average number of duplicates per record is based on the single (or other nodes) that include several duplicates, duplicate removal based on an average number of records per node may not be beneficial from a system resource utilization perspective, if the records needed for a query response include the records with a few duplicates.

The system 100 thus provides for optimization of system resource utilization by performing duplicate removal for a node based on unique key values for a given node. For the foregoing example of a given record including, for example, 1000 duplicates and the remaining records including one or no duplicates (or very few duplicates), the pre-processing module 101 may determine that duplicate removal may be performed for the particular record with 1000 duplicates. The remaining records including one or no duplicates (or very few duplicates) may be sent to a destination node for performing duplicate removal at the destination node, which may perform duplicate removal anyway based on the number of identical records received from various nodes. In this manner, system resource utilization may be optimized by performing duplicate removal only for those records with a significant number of duplicates.

Referring to FIG. 1, in order to perform grouping of records, the module 102 may group records as described herein. For grouping, instead of performing duplicate removal to obtain a single copy of a record, grouping may include forming a result based on a collection of similar or identical records. For example, as discussed above, for a table of employees including names, addresses, employment year, department ID, and salary, grouping may include determination of an average salary per department. In order to determine the average salary per department, records that have the same department ID may be brought together. For multiples of such records, the salaries may be added and counted. An average salary per department may be computed. For the foregoing grouping example, for each record with an equal department ID, a counter may be incremented to determine the number of records for computing an average.

For example, for a company with employees at 5 sites, in order to compute average salary per department, with each department spanning multiple sites, one method may be for an administrator at a site to obtain all employee records and send the records to an appropriate location in response to a query. Alternatively, the administrator may aggregate the information by, for example, combining employees based on the same salaries. For example, at each site, the administrator may make tables for different departments and the number of employees having the same salary per department, and aggregate appropriately for those records that have several duplicates.

Figure 15:
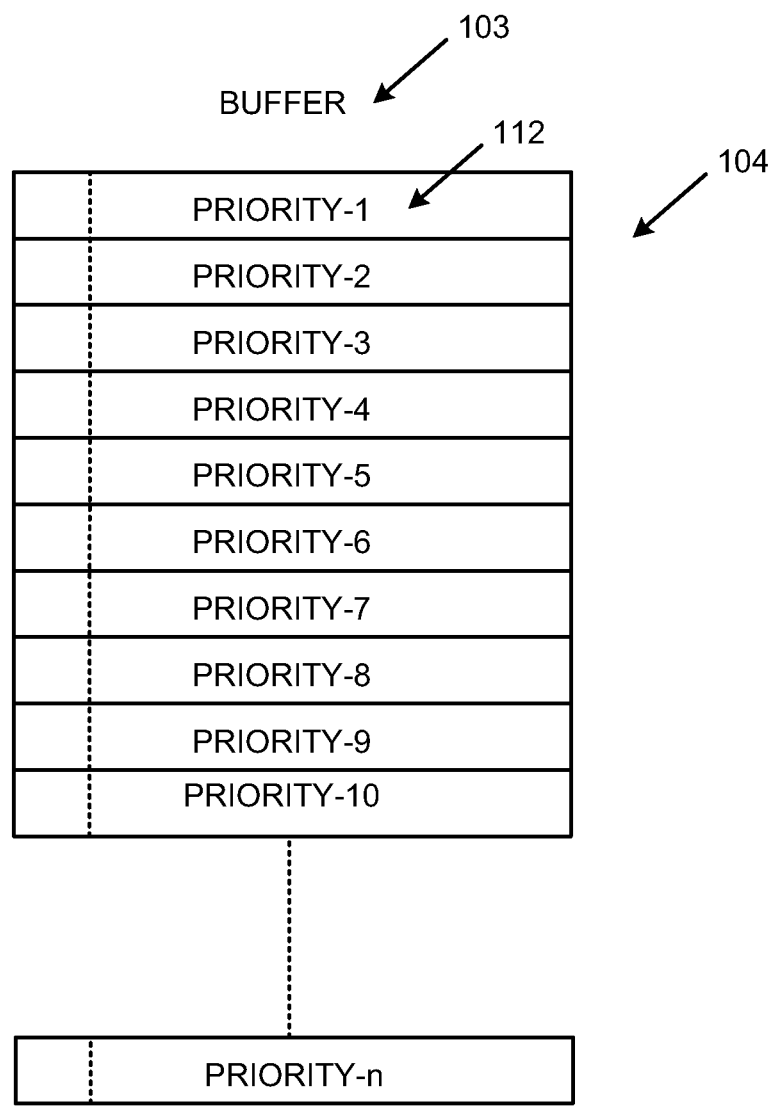
FIG. 15 illustrates a simplified buffer used with the parallel aggregation system, according to an embodiment.

Referring to FIG. 1, the buffer 103 (similar to a hash table) may also facilitate query response by including records that are accessed repeatedly. As shown in FIG. 15, the buffer 103 may hold a predetermined number of records 112 (e.g., 100, 1000 records etc.). The buffer 103 may also include the priority queue 104 integrated therewith for prioritizing the records. In order to respond to the query 105, the system 100 may first determine if an input record is in the buffer. If not, the system 100 may locate the record as discussed above and perform duplicate removal as needed. Once the record is located, a copy of any record not in the buffer 103 may be placed in the buffer and prioritized, for example, by giving the most recently located record the highest priority. In this manner, any record that has been in the buffer for the longest time and exceeds the buffer capacity may be discarded from the buffer. Any record that was already in the buffer and subject to a query may be moved up to the highest priority in the buffer. The buffer may thus include as the highest priority the records that occur most frequently. The buffer may also thus eliminate or reduce overall transfer of duplicates across a network by allowing records with the highest priority that are in the buffer to be sent to a destination node without actual search, retrieval and duplicate removal being performed on the records that are already in the buffer. The buffer may also increase, for example, the query and related response time by eliminating the need for search, retrieval and duplicate removal for the records that are already in the buffer.

The buffer 103 thus maintains a data structure that is organized by lookup for equality. For example, for a given record, the system 100 may first determine if an identical record exists in the buffer. The data structure may also be organized to include the priority queue 104 for facilitating determination of records that are frequently (e.g., at top of the priority queue) and infrequently (e.g., at bottom of the priority queue) requested.

Based on the foregoing, the system 100 may combine local and global aggregation, and further data exchange into a single operation. In an example, the system may include a single memory allocation and associative data structure, e.g., a hash table. Input records from the input (e.g., a table scan) or from a parallel instance of the system may be treated similarly. For example, input records from parallel instances of the system may be processed first.

As described above, the parallel aggregation system may transfer records to temporary storage (e.g., a run in the system based on sorting or an overflow partition in the system based on partitioning) or to parallel instances of the system. Temporary storage may be provided for records that do not need further partitioning, and otherwise, parallel instances may be provided.

As also described in above, upon arrival of an input record, its grouping keys may be extracted and matched with records already in the data structure. If found, aggregation may proceed. Otherwise, if sufficient free memory is available, a new record may be allocated in the data structure. Otherwise, a sufficient number of records may be ejected from the data structure. For example, a single record may be used, but multiple records may be used if record lengths differ. For example, if all the records that were needed are of the same length, in order to insert a record, a corresponding record may be ejected first. Once ejected, sufficient space may exist for the new incoming record. Otherwise, if records were not all of the same size, multiple records, or a record of a larger size compared to the incoming record may be discarded to allocate space for an incoming record.

In order to maximize the benefit of the in-memory data structure, as described above, the buffer may be provided for retention of records that absorb many input records. For example, based on the buffer size, a record that has not absorbed an input record for the longest time may be ejected from the buffer. For example, as described above, when an input record arrives, that record may be matched with a record already in the data structure. If a match is located, the input record may be calculated into that existing record. For example, for the foregoing grouping example for the table of employees, if a record already exists for a department ID with n employees having a given total salary, if another employee arrives for the same department ID, the salary of the new employee may be added to the total salary with the count of employees incremented by the new employee.

For the buffer, the priority queue may be used to maintain the appropriate information efficiently and incrementally. The root of the priority queue may point to the record with the longest time since it absorbed an input record. If the key value distribution in the input is skewed such that some records absorb more input records than others, the leaves of the priority queue may point to the active records. If the priority queue is implemented with a tree of losers, and if maintenance of the priority queue relies exclusively on leaf-to-root paths through the binary heap representing the priority queue, then half of all aggregation operations may inspect only one leaf in the priority queue, and aggregation operations may inspect two nodes in the priority queue on average. Additionally, if the key value distribution is skewed, more than half of all aggregation operations may inspect only one leaf, and all aggregation operations on average may inspect less than two nodes in the priority queue.

For the system 100, each node may take only local decisions, i.e., based on local observations and taken without communication with other nodes, and may employ as much space for local aggregation as deemed efficient. For example, if only memory, but not local temporary storage, is faster (more energy-efficient, etc.) than communication to another node, then the node may employ a hash table in memory to perform some aggregation and send each input item to its destination node if memory space is scarce.

Assuming that local aggregation for all input data is not possible with the desired efficiency, one possible strategy may be to send all input items to their destination node. Another possible strategy may be to force local aggregation, even if it means employing local temporary storage or other remedies that affect efficiency. Instead, the system 100 keeps some data items locally for aggregation, sends some data items immediately to their destination node, and modifies the choice over time as guided by a policy. Distinct values of the grouping attribute may be assigned either to the local in-memory hash table or to immediate re-partitioning to the destination node. The policy may choose among these alternatives anticipated consumption rate of subsequent input items. The consumption rate of data items in memory is the rate at which input items can be aggregated into the item in the hash table. Keeping groups in memory that absorb many input items reduces the number of input items sent immediately to their destination nodes.

Lacking further information, the future absorption rate of a given item in the in-memory hash table may be anticipated based on its recent absorption rate or on the number of input items processed since the given item has absorbed its most recent input item. To protect against outlier situations, the number of input items since the given item has absorbed its $2^{nd}$ or $3^{rd}$ most recent input item may be considered.

For the foregoing policy focusing on the input items processed since the given item has absorbed an input item most recently, the items in the hash table may be organized in the priority queue 104 such that the item with the least recent absorption is always readily available. Moreover, each time an item absorbs an input item, its position in the priority queue may be updated. Thus, a priority queue implementation may support efficient increment operations for the priority queue key, i.e., efficient movement of a given item away from the root of the priority queue.

As discussed above, the priority queue 104 may be considered a "tree of losers" priority queue. In addition to the standard operations on such a priority queue implementation, an efficient method may be needed to move an item away from the root. This method may use a standard leaf-to-root pass, ending when the desired entry is found. Assuming a random input sequence, the desired entry may be found in the leaf with, for example, a 50% probability. For example, on average, the desired entry may be the $2^{nd}$ entry on the leaf-to-root pass. This value may be independent of the size of the priority queue and thus very efficient even for very large memory and hash table sizes.

3. Method

Figure 16:
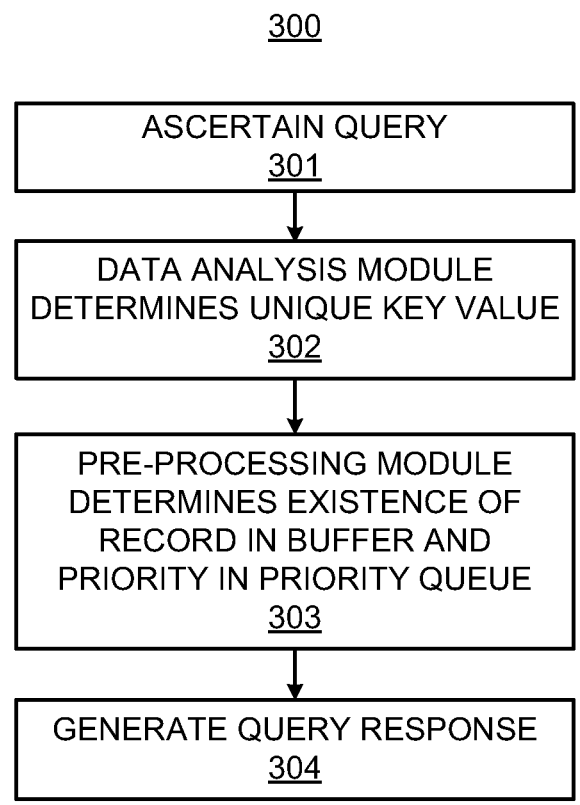
FIG. 16 illustrates a method for parallel aggregation, according to an embodiment.
Figure 17:
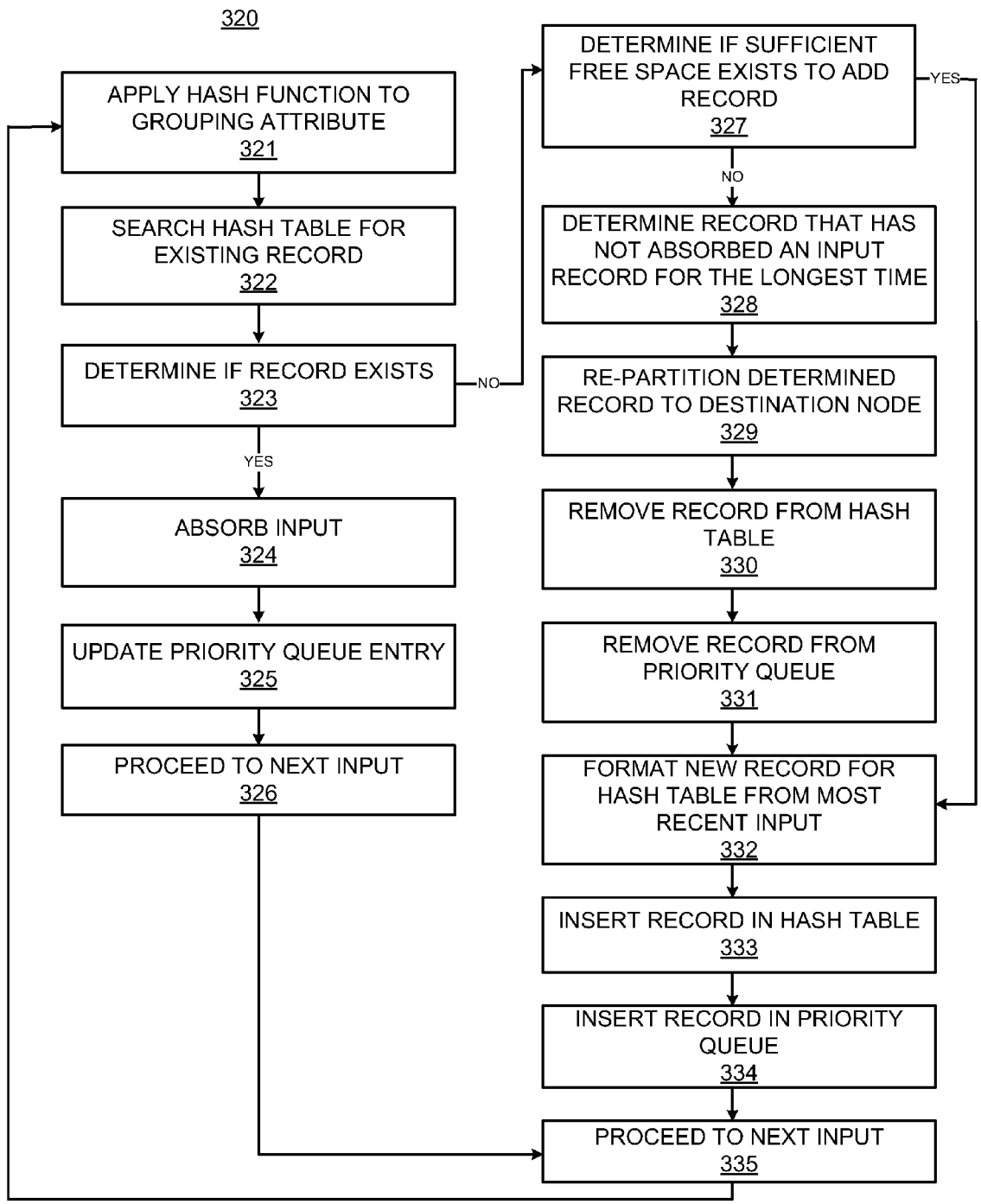
FIG. 17 illustrates details of the method for parallel aggregation as applied to each input item, according to an embodiment.

FIG. 16 illustrates a method 300 for parallel aggregation, according to an embodiment. FIG. 17 illustrates details of a method 320 for parallel aggregation as applied to each input item, according to an embodiment. The methods 300 and 320 are described with respect to the parallel aggregation system 100 shown in FIG. 1 by way of example and not limitation. The methods 300 and 320 may be performed by other systems.

Referring to FIG. 16, at block 301, the system 100 may receive the query 105 and ascertain the requirements of the query. For example, the user 107 may present the query 105 pertaining to the data 108 to the system 100.

At block 302, the data analysis module 101 may determine a unique key value of a record to be forwarded to a destination.

At block 303, the pre-processing module 102 may determine existence of the record in the buffer 103 and priority of the record in the priority queue 104. Based on the existence and priority, the pre-processing module 102 may absorb the record in the buffer 103 and selectively forward another record in the buffer to the destination. The details of the processes at block 303 are described below with reference to FIG. 17.

At block 304, the system 100 may generate the query response 109 formed by combining the results from various nodes.

Referring now to FIG. 17, details of the method 320 for parallel aggregation as applied to each input item, according to an embodiment, will be described.

At block 321, for an input item, a hash function may be applied to the grouping attribute.

At block 322, the hash table (e.g. buffer 103 or hash table 130) may be searched for an existing record with the same value in the grouping attribute.

At block 323, if no such record exists, the method 320 proceeds to block 327.

At block 324, the input item may be absorbed.

At block 325, the priority queue entry may be updated for the record in the hash table.

At block 326, the method 320 proceeds to block 335.

At block 327, it is determined if sufficient free space exists to add a record to the hash table. If yes, the system 100 proceeds to block 332.

At block 328, using the priority queue 104, the record in the hash table that has not absorbed an input record for the longest time is determined.

At block 329, the record determined at block 328 may be re-partitioned (sent) to its destination node, which is determined using the value of the grouping attribute in the record.

At block 330, the record determined at block 328 may be removed from the hash table.

At block 331, the record determined at block 328 may be removed from the priority queue.

At block 332, a new record may be formatted for the hash table from the most recent input item.

At block 333, the record of block 332 may be inserted into the hash table.

At block 334, the record of block 332 may be inserted into the priority queue 104.

At block 335, the system 100 may return to block 321 for the next input item.

The method 320 may be optimized, for example, by removal of pairs of removal and insertion in the priority queue 104 in favor of a replacement within the priority queue 104. A similar optimization may be applied to space for the record in memory and for the data structure representing a record in the hash table.

4. Computer Readable Medium

Figure 18:
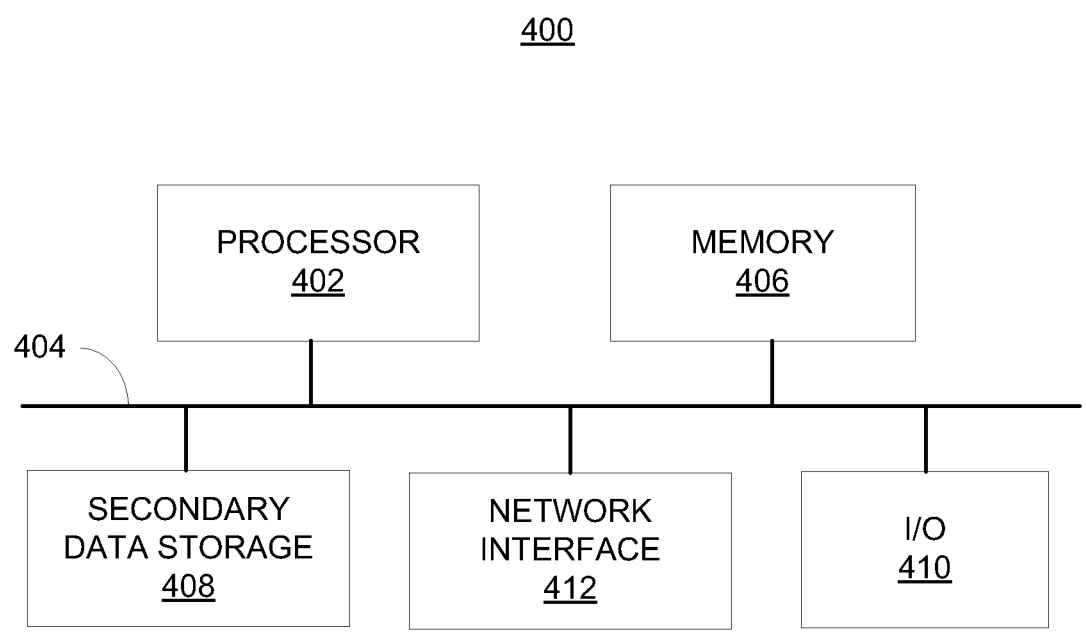
FIG. 18 illustrates a computer system that may be used for the method and system, according to an embodiment.

FIG. 18 shows a computer system 400 that may be used with the embodiments described herein. The computer system 400 represents a generic platform that includes components that may be in a server or another computer system. The computer system 400 may be used as a platform for the system 100. The computer system 400 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 includes a processor 402 that may implement or execute machine readable instructions performing some or all of the methods, functions and other processes described herein. Commands and data from the processor 402 are communicated over a communication bus 404. The computer system 400 also includes a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums.

The computer system 400 may include an I/O device 410, such as a keyboard, a mouse, a display, etc. The computer system 400 may include a network interface 412 for connecting to a network. Other known electronic components may be added or substituted in the computer system 400.

While the embodiments have been described with reference to examples, various modifications to the described embodiments may be made without departing from the scope of the claimed embodiments.

What is claimed is:

1. A parallel aggregation system comprising:
   a data analysis module, executed by a processor, to determine a unique key value of a record to be forwarded to a destination; and
   a pre-processing module to use the unique key value to determine existence of the record in a buffer and priority of the record in a priority queue, and based on the existence and priority, to absorb the record in the buffer and selectively eject another record from the buffer for forwarding to the destination, wherein to selectively eject another record from the buffer for forwarding to the destination the pre-processing module is to further selectively eject a plurality of further records from the buffer based on the size of the record.

2. The system of claim 1, wherein the buffer includes a predetermined number of recently accessed records.

3. The system of claim 2, wherein the recently accessed records are placed in the priority queue from most recently accessed to least recently accessed.

4. The system of claim 3, wherein the least recently accessed record in the buffer is ejected from the buffer and forwarded to the destination if a number of the records in the buffer exceeds a buffer capacity.

5. The system of claim 1, wherein in response to a query, the system first accesses the buffer to locate the record, and if the record is not in the buffer, the system accesses a source to obtain the record.

6. The system of claim 1, wherein absorbing the record in the buffer includes aggregation.

7. The system of claim 1, wherein the buffer includes a hash table.

8. The system of claim 1, wherein the pre-processing module further directly forwards the record to the destination if the record has not been absorbed in the buffer for a predetermined amount of time.

9. A method for parallel aggregation, the method comprising:
   determining, by a processor, a unique key value of a record to be forwarded to a destination; and
   using the unique key value to determine existence of the record in a buffer and priority of the record in a priority queue, and based on the existence and priority absorbing the record in the buffer and selectively ejecting another record from the buffer for forwarding to the destination, wherein selectively ejecting another record from the buffer for forwarding to the destination further includes selectively ejecting a plurality of further records from the buffer based on the size of the record.

10. A non-transitory computer readable medium storing machine readable instructions, that when executed by a computer system, perform a method for parallel aggregation, the method comprising:
    determining, by a processor, a unique key value of a record to be forwarded to a destination; and
    using the unique key value to determine existence of the record in a buffer and priority of the record in a priority queue, and based on the existence and priority absorbing the record in the buffer and selectively ejecting another record from the buffer for forwarding to the destination, wherein selectively ejecting another record from the buffer for forwarding to the destination further includes selectively ejecting a plurality of further records from the buffer based on the size of the record.

11. The system of claim 1, wherein the priority queue is a tree of losers based priority queue.

12. The system of claim 1, wherein the priority queue is a tree of losers based priority queue that provides for absorption of the record, on average, as a second entry on a leaf-to-root pass of the priority queue.

13. The system of claim 1, wherein the priority queue includes a root that points to a record with a longest time between absorption of records, and leaves that point to records with a shortest time between absorption of records.

14. The system of claim 13, wherein the pre-processing module is to further update a position of the record in the priority queue from a previous position of the record in the priority queue based on subsequent absorptions of the record in the buffer to provide for movement of the record away from the root of the priority queue.

15. The system of claim 1, wherein to selectively eject another record from the buffer for forwarding to the destination the pre-processing module is to further determine a size of the record and the another record, and to selectively eject a different record of a larger size from the buffer if the another record has a smaller size compared to the size of the record.

16. The system of claim 1, wherein to selectively eject another record from the buffer for forwarding to the destination the pre-processing module is to further selectively eject the another record from the buffer for forwarding to the destination based on a length of time the another record has not absorbed records.

17. The system of claim 1, wherein the pre-processing module is to further determine a future absorption rate of records based on a recent absorption rate of records.

18. The system of claim 1, wherein the pre-processing module is to further determine a future absorption rate of records based on a number of records processed since absorption of the record.

19. The system of claim 1, wherein the pre-processing module is to further determine a future absorption rate of records by accounting for outlier records.

20. The system of claim 1, wherein the pre-processing module is to further update a position of the record in the priority queue from a previous position of the record in the priority queue based on subsequent absorptions of the record in the buffer.

* * * * *